United States Patent [19]

Iwagaya

[11] Patent Number: 4,956,765
[45] Date of Patent: Sep. 11, 1990

[54] APPARATUS FOR PROCESSING NUMERICAL CONTROL PROGRAM

[75] Inventor: Takashi Iwagaya, Hachioji, Japan

[73] Assignee: Fanuc Ltd., Minamitsuru, Japan

[21] Appl. No.: 150,652

[22] PCT Filed: May 7, 1987

[86] PCT No.: PCT/JP87/00283

§ 371 Date: Jan. 7, 1988

§ 102(e) Date: Jan. 7, 1988

[87] PCT Pub. No.: WO87/07045

PCT Pub. Date: Nov. 19, 1987

[30] Foreign Application Priority Data

May 7, 1986 [JP] Japan ................... 61-104086

[51] Int. Cl.$^5$ .................... G06F 15/02; G06F 3/02
[52] U.S. Cl. ....................... 364/192; 364/474.23;
364/280.4; 364/973; 364/200; 364/900
[58] Field of Search ... 364/200 MS File, 900 MS File, 364/300, 474.22, 474.31, 474.36, 551.02, 191, 192, 474.23

[56] References Cited

U.S. PATENT DOCUMENTS

| | | | |
|---|---|---|---|
| 4,156,928 | 5/1974 | Inose et al. | 364/900 |
| 4,199,814 | 3/1980 | Rapp et al. | 364/474.22 |
| 4,229,804 | 10/1980 | Kokayashi et al. | 364/900 |
| 4,396,112 | 12/1982 | Onodera et al. | 364/200 |
| 4,396,976 | 8/1983 | Hyatt | 364/474.22 |
| 4,589,091 | 5/1986 | Imazeki et al. | 364/474.23 |
| 4,607,347 | 8/1986 | Kummer et al. | 364/900 |
| 4,667,290 | 5/1987 | Goss et al. | 364/300 |
| 4,747,044 | 5/1988 | Schmidt et al. | 364/200 |
| 4,777,590 | 10/1988 | Durkos et al. | 364/200 |

OTHER PUBLICATIONS

"Encyclopedia of Computer Science and Engineering," 2nd Ed., pp. 254–255.

Primary Examiner—Jerry Smith
Assistant Examiner—Paul Gordon
Attorney, Agent, or Firm—Staas & Halsey

[57] ABSTRACT

A numerical control program in the form of a high-level language on a paper tape (14) is converted in its entirety to a machine language by using a compiler stored in a compiler cassette (19). The converter program is then stored in a RAM area (12) of a numerical control system (numerical control program storage area), and thereafter written as the machine language into a new ROM cassette (18) by writing means such as a ROM writer (17). The ROM cassette (18) is detachable from the numerical control system and can be carried away. For executing a numerical control process, the ROM cassette (18) is attached to the numerical control system, and the numerical control program stored as the machine language in the ROM cassette (18) is transferred to the numerical control system, after which the numerical control program is executed.

5 Claims, 1 Drawing Sheet

APPARATUS FOR PROCESSING NUMERICAL CONTROL PROGRAM

TECHNICAL FIELD

The present invention relates to an apparatus for processing a numerical control program for controlling a numerical control system.

BACKGROUND ART

Recent numerical control systems which mostly incorporate computers are called computerized numerical control (CNC) systems. The CNC system has a microprocessor and other components such as a tape reader, switches, lamps, and a servomechanism which are connected to the microprocessor through a bus line extending therefrom. The states of all of these components are detected from time to time by the microprocessor, which applies commands to these components to effect various operations according to a numerical control program. The numerical control program is ordinarily stored on a punched tape. Before the CNC system is operated, the punched tape is fed through the tape reader which then transfers the program from the punched tape into a random-access memory (RAM) in the CNC system. In some CNC systems, a numerical control program stored in a read-only memory (ROM) in the CNC system is transferred into the RAM.

Thereafter, numerically controlled operation is effected according to the numerical control program stored in the RAM.

The numerical control program in the punched tape or the RAM is stored in the form of a numerical control high-level language such as FAPT. Each time the numerical control program is executed, it is usually converted to a machine language applicable to the numerical control system by using a compiler stored in the numerical control system.

According to the prior art, when the numerical control program is executed, a tape editing area in the numerical control program must be used, and the processing time includes a time required to compile the numerical control program. Thus, the numerical control program cannot quickly be executed. Where a paper tape is employed to store a numerical control program, difficulty is experienced in keeping secrets since the numerical control program can easily be read by a human being.

SUMMARY OF THE INVENTION

Therefore, it is an object of the present invention to provide an apparatus for processing a numerical control program, which will eliminate the aforesaid problem, and more particularly to an apparatus for processing a numerical control program, wherein secrecy is provided by storing a numerical control program in a ROM, a memory is protected against destruction, and the numerical control program can quickly be processed.

To achieve the above object, there is provided in accordance with the present invention an apparatus for processing a numerical control program for controlling a numerical control system, comprising a compiler cassette detachable from the apparatus and storing therein a compiler for converting a numerical control program in the form of a high-level language to a machine language, converting means for converting, with the compiler, a numerical control program input to the numerical control system in the form of a high-level language to a machine language applicable to the numerical control system, a ROM cassette detachable from the apparatus and having a read-only memory therein, writing means for writing the numerical control program as converted to the machine language into the read-only memory in the ROM cassette, and control means for controlling the numerical control system accordign to the numerical control program stored in the read-only memory in the ROM cassette.

BRIEF DESCRIPTION OF THE DRAWING

The FIGURE is a block diagram of an embodiment of the present invention, showing a numerical control system in the form of a computer connected to peripheral devices.

DESCRIPTION OF THE PREFERRED EMBODIMENT

Figure 1:
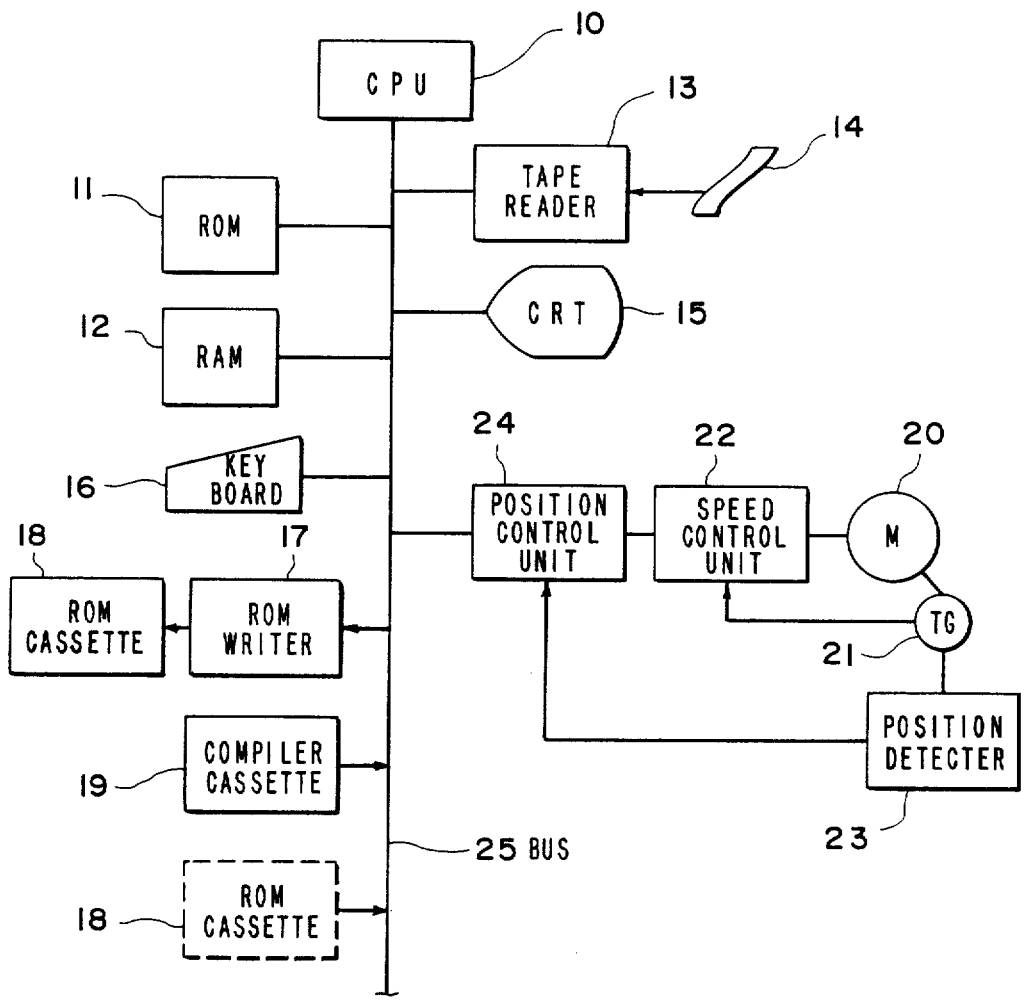

An embodiment of the present invention will hereinafter be described in specific detail with reference to the drawing.

The FIGURE is a block diagram of an embodiment of the present invention, showing a numerical control system (CNC) in the form of a computer connected to peripheral devices.

Denoted in the FIGURE at 10 is a central processing unit (CPU), 11 a read-only memory (ROM) storing an operating system and invariable data, 12 a random-access memory (RAM) for temporarily storing data when numerical control operation is effected and for storing a numerical control (NC) program which is input from an external source, and 13 a tape reader for reading a stored NC program from a paper tape 14. The NC program stored in the paper tape 14 is stored in the form of a high-level language for the NC program, such as FAPT. Designated at 15 is a CRT display unit for displaying machining data while NC machining is being effected and the NC program being edited, 16 a keyboard, and 17 a ROM writer associated with the numerical control system for writing the NC program as converted to a machine program (described later) into a ROM cassette 18. The ROM cassette 18 is a cassette comprising a bubble memory or an EPROM and detachable from the numerical control system. When attached to the numerical control system, the ROM cassette 18 is connected to a bus line and controlled by the CPU 10. Denoted at 19 is a compiler cassette having a ROM storing a compiler for converting the NC program expressed by a high-level language such as FAPT to a machine program. Like the ROM cassette 18, the compiler cassette 19 is a cassette comprising a bubble memory or an EPROM and detachable from the numerical control system. When attached to the numerical control system, the comiler cassette 19 is connected to the bus line and controlled by the CPU 10.

Designated by the reference numeral 20 is a servomotor of a machine tool or a robot which is controlled by the NC system. A rotational speed signal of the servomotor 20 is fed from a tachometer generator 21 back to a speed control unit 22, and an angular position signal of the servomotor 20 is fed from a position detector 23 back to a position control unit 24. Denoted at 25 is a bus.

While there are various other devices connected to the bus of the numerical control (CNC) system, they will not be described for brevity.

Operation of the embodiment of the present invention will be described below.

The contents of an NC program expressed by a high-level language such as FAPT and stored in a storage medium such as the paper tape 14 are first converted to a format which can easily be executed by the numerical control (CNC) system, by using a compiler stored in the compiler cassette 19 attached to the numerical control (CNC) system. The conversion to such a format is, for example, the conversion from the contents of the NC program to a machine language.

The contents of the NC program as converted to the format which can easily be executed by the numerical control (CNC) system are temporarily stored in the RAM 12, and then read out and written into the ROM in the ROM cassette 18 by the ROM writer 17. As many ROM cassettes 18 as desired can be copied by such a process. The above editing process is executed while putting the numerical control (CNC) system in an editing mode.

For the numerical control (CNC) system to execute a numerical control process, the ROM cassette 18 which stores the numerical control program as converted by the compiler cassette 19 to the format that can easily be executed by the numerical control (CNC) system is connected to the numerical control (CNC) system, as indicated by the dotted lines, and the stored NC program is read out and stored into the RAM 12. Thereafter, the NC process is executed according to the NC program stored in the RAM 12.

With the present invention, as described above, the numerical control program is converted to the format which can easily be executed for numerical control, by using the memory device storing the compiler, and the converted program is stored into the ROM cassette by the ROM cassette writer. Subsequently, the numerical control program is executed by employing the ROM cassette. Accordingly, program secrecy is provided, and the numerical control program can quickly be executed.

The present invention is applicable to not only numerically controlled machine tools, but also all devices controlled by numerical control systems, such as a device for controlling an industrial robot, a device for controlling an electric discharge machine tool, and the like. The compiler cassette and the ROM cassette can be replaced with floppy discs, portable magnetic discs, magnetic tape cassettes, or the like through a mere design change. While the high-level language is converted to the machine language by the numerical control system having the ROM writer according to the present invention, such conversion may be effected by a numerical control program.

I claim:

1. An apparatus for processing a numerical control program for controlling a numerical control system, comprising:

compiler cassette means for compiling data and being detachable from the apparatus and including converting means for converting a numerical control program input to the numerical control system in the form of a high-level language to a machine language applicable to the numerical control system;

ROM cassette means, detachable from the apparatus and having a read-only memory, for storing programs;

writing means for writing the numerical control program as converted to the machine language by said compiler cassette into the read-only memory of said ROM cassette means; and control means for controlling the numerical control system according to the numerical control program stored in the read-only memory of said ROM cassette means.

2. An apparatus according to claim 1, wherein said compiler cassette means includes a bubble memory.

3. An apparatus according to claim 1, wherein said compiler cassette means includes an EPROM.

4. An apparatus according to claim 1, wherein the read-only memory of said ROM cassette means comprises a bubble memory.

5. An apparatus according to claim 1, wherein the read-only memory of said ROM cassette means comprises an EPROM.

* * * * *